US011955595B2

(12) United States Patent
Lin et al.

(10) Patent No.: US 11,955,595 B2
(45) Date of Patent: Apr. 9, 2024

(54) HIGH-IONIC CONDUCTIVITY CERAMIC-POLYMER NANOCOMPOSITE SOLID STATE ELECTROLYTE

(71) Applicant: Bioenno Tech LLC, Santa Ana, CA (US)

(72) Inventors: Zhigang Lin, Santa Ana, CA (US); Chunhu Tan, Santa Ana, CA (US); Chao Yi, Santa Ana, CA (US)

(73) Assignee: Bioenno Tech LLC, Santa Ana, CA (US)

( * ) Notice: Subject to any disclaimer, the term of this patent is extended or adjusted under 35 U.S.C. 154(b) by 294 days.

(21) Appl. No.: 16/390,584

(22) Filed: Apr. 22, 2019

(65) Prior Publication Data

US 2020/0335814 A1 Oct. 22, 2020

(51) Int. Cl.
*H01M 10/056* (2010.01)
*H01M 4/38* (2006.01)
*H01M 4/58* (2010.01)
*H01M 10/052* (2010.01)
*H01M 50/446* (2021.01)
(Continued)

(52) U.S. Cl.
CPC ......... *H01M 10/056* (2013.01); *H01M 4/382* (2013.01); *H01M 4/5825* (2013.01); *H01M 10/052* (2013.01); *H01M 50/446* (2021.01); *H01M 50/497* (2021.01); *H01M 10/0525* (2013.01); *H01M 2300/0071* (2013.01); *H01M 2300/0082* (2013.01); *H01M 2300/0091* (2013.01)

(58) Field of Classification Search
CPC ............. H01M 50/446; H01M 50/449; H01M 2300/0091; H01M 2300/0065; H01M 2300/0071; H01M 2300/0068; H01M 2300/0082; H01M 50/497; H01M 10/056; H01M 10/0525
See application file for complete search history.

(56) References Cited

U.S. PATENT DOCUMENTS

| | | |
|---|---|---|
| 5,728,489 A | 3/1998 | Gao |
| 5,834,136 A | 11/1998 | Gao |
| 5,964,903 A | 10/1999 | Gao |

(Continued)

OTHER PUBLICATIONS

Studies on Ionic Conductivity and Electrochemical Stability of Plasticized Photopolymerized Polymer Electrolyte Membranes for Solid State Lithium Ion Batteries, Ph D Thesis by Ruixuan He, University of Akron, Dec. 2016.

*Primary Examiner* — Jeremiah R Smith
(74) *Attorney, Agent, or Firm* — Charles H Jew

(57) ABSTRACT

A ceramic-polymer film includes a polymer matrix; a plasticizer; a lithium salt; and $Al_xLi_{7-x}La_3Zr_{1.75}Ta_{0.25}O_{12}$ where x ranges from 0.01 to 1 (LLZO), wherein the LLZO are nanoparticles with diameters that range from 20 to 2000 nm and wherein the film has an ionic conductivity of greater than $1\times10^{-3}$ S/cm at room temperature. The nanocomposite film can be formed on a substrate and the concentration of LLZO nanoparticles decreases in the direction of the substrate to form a concentration gradient over the thickness of the film. The film can be employed as a non-flammable, solid-state electrolyte for lithium electrochemical cells and batteries. The LLZO serves as a barrier to dendrite growth.

11 Claims, 5 Drawing Sheets

(51) Int. Cl.
*H01M 50/497* (2021.01)
*H01M 10/0525* (2010.01)

(56) References Cited

U.S. PATENT DOCUMENTS

| | | | |
|---|---|---|---|
| 6,020,087 | A | 2/2000 | Gao |
| 6,156,458 | A | 12/2000 | Brodd |
| 6,159,638 | A * | 12/2000 | Takatera ........... H01M 10/0565 |
| | | | 429/309 |
| 6,596,440 | B2 | 7/2003 | Gavelin |
| 6,905,762 | B1 | 6/2005 | Jow |
| 7,166,366 | B2 | 1/2007 | Moser |
| 8,198,783 | B2 | 6/2012 | Bayer |
| 9,548,514 | B2 | 1/2017 | Kyu |
| 9,819,053 | B1 | 11/2017 | Zimmerman |
| 2005/0287441 | A1 | 12/2005 | Passerini |
| 2006/0216608 | A1* | 9/2006 | Ohata ..................... H01M 4/13 |
| | | | 429/246 |
| 2011/0053002 | A1* | 3/2011 | Yamamura ............ C04B 35/486 |
| | | | 429/322 |
| 2014/0255772 | A1* | 9/2014 | Kyu ................... H01M 10/052 |
| | | | 429/189 |
| 2018/0034025 | A1* | 2/2018 | Lee .................. H01M 10/0525 |
| 2019/0088998 | A1* | 3/2019 | Schuhmacher ..... H01M 50/409 |
| 2019/0115616 | A1* | 4/2019 | Ahn ................. H01M 10/0525 |
| 2019/0341597 | A1* | 11/2019 | Tempel ................ H01M 50/46 |
| 2020/0144665 | A1* | 5/2020 | Huang ................... C08F 22/22 |
| 2020/0153041 | A1* | 5/2020 | Ryu .................... H01M 4/1399 |
| 2020/0266478 | A1* | 8/2020 | Castro ................ H01M 10/056 |
| 2020/0280093 | A1* | 9/2020 | Sakamoto ............. H01M 4/525 |
| 2021/0102063 | A1* | 4/2021 | Lin ...................... H01M 6/181 |

* cited by examiner

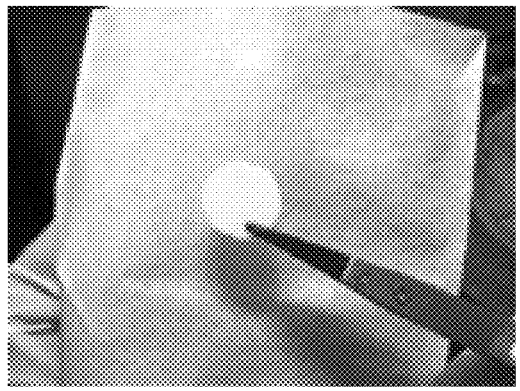
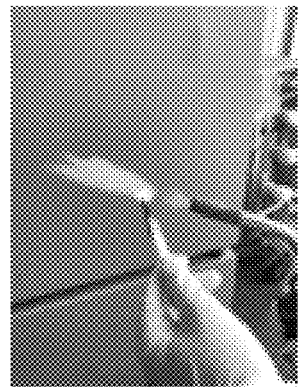
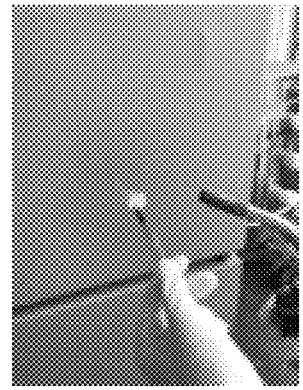
FIG. 3A  FIG. 3B  FIG. 3C
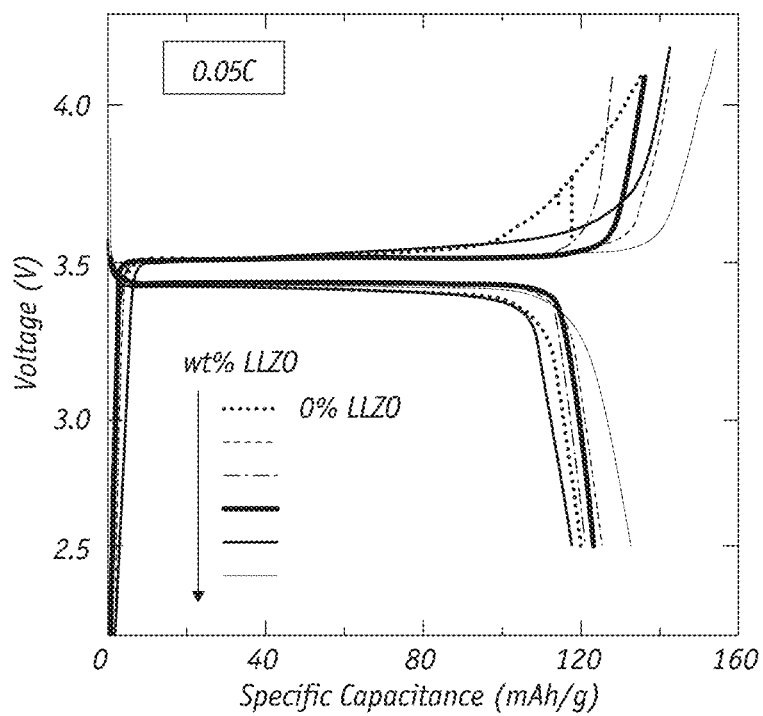
FIG. 4A

HIGH-IONIC CONDUCTIVITY CERAMIC-POLYMER NANOCOMPOSITE SOLID STATE ELECTROLYTE

The invention was made with Government support under SBIR Grant No. N6833518C0685 awarded by the U.S. Navy to Bioenno Tech LLC. The Government has certain rights to the invention.

FIELD OF THE INVENTION

The present invention generally relates to electrochemical devices and, more particularly, to a method of fabricating polymeric electrolytes having superior ionic conductivity and mechanic properties for electrochemical cells and batteries.

BACKGROUND OF THE INVENTION

Non-aqueous lithium electrochemical cells typically include an anode, a lithium electrolyte prepared from a lithium salt dissolved in one or more organic solvents and a cathode of an electrochemically active material. Organic solvents are typically low molecular weight organic solvents that are added for solvating the inorganic ion salt in the electrolyte. During discharge, lithium ions from the anode pass through the liquid electrolyte to the electrochemically active material of the cathode where the ions are taken up with the simultaneous release of electrical energy. During charging, the flow of ions is reversed so that lithium ions pass from the electrochemically active cathode material through the electrolyte and are plated back onto the lithium anode.

Solid electrolytes can replace conventional organic liquid electrolytes, which are generally flammable and toxic. Conventional electrode materials and lithium metal anodes can be employed with solid-state electrolytes. Lithium anodes have high inherent high capacities (C) which increase the cell voltage (V) and thereby improves the energy density of the battery (E=VC). There are two critical challenges to achieving high performance batteries using solid electrolytes: (1) low ionic conductivities of many solid electrolytes, and (2) large resistance posed by the electrode-electrolyte interface. Solid-state electrolytes being explored are typically inorganic based (depending on the lattice structure, they are garnet, perovskite, glass-ceramics etc.) and polymer based. Solid polymer electrolytes can be prepared by less complex and lower-cost manufacturing whereas solid inorganic electrolytes with well-defined compositions or lattice structures require high temperature processes. Due to the strong coordination between Li ions and the polymer chain, chain-assisted Li ion transport mechanism is less effective at room temperature or below the melting temperature of the polymer, which inhibits Li ion transport leading to poor ionic conductivity. The addition of a plasticizer improves the polymer chain mobility at room/low temperatures and thus enhances its ionic conductivity but at the expense of the mechanical strength of the solid polymer.

Another problem with using solid polymer electrolytes in electrochemical cells is that lithium dendrites which develop as the cell undergoes charging and discharging cycles penetrate through the 'plasticizer-softened' polymer electrolytes to short the cell. Current solid polymer electrolytes also do not form intimate contact with cathode materials. The electrochemical cell is normally prepared by stacking a solid electrolyte layer onto a cathode layer. Due to the rigid nature of two solid layers, the contact between the surfaces of the two layers is not intimate which reduces the effective area for Li ion transport. Moreover, the porous structures of many cathode materials further reduce their loading in Li cells and batteries. Solid electrolytes can diffuse only to a limited extent into the cathode materials, thus, only a restricted surface region of the cathode materials participates in the electrochemical process as the cell or battery operates.

SUMMARY OF THE INVENTION

The present invention is based in part on the development of a ceramic-polymer nanocomposite solid-state electrolyte in which ionic conductive ceramic nanoparticles are embedded in an amorphous polymer matrix. The ceramic phase is an oxide with the formula: $Al_xLi_{7-x}La_3Zr_{1.75}Ta_{0.25}O_{12}$ where x ranges from 0.01 to 1 (LLZO), which is chemically stable and conductive.

In one aspect, the invention is directed to a ceramic-polymer film that includes: a polymer matrix; a plasticizer; a lithium salt; and LLZO, wherein the LLZO are nanoparticles with diameters that range from 20 nm to 2000 nm and wherein the film has an ionic conductivity of greater than $1 \times 10^{-3}$ S/cm at room temperature.

In another aspect, the invention is directed to an electrochemical cell which includes: an anode; a cathode; and interposed therebetween a solid-electrolyte which comprises: a polymeric matrix; a plasticizer; a lithium salt; and LLZO, wherein the LLZO are nanoparticles with diameters that range from 20 nm to 2000 nm.

In yet another aspect, the invention is directed to a process for preparing an electrochemical cell which includes:
(a) providing a cathode;
(b) providing an anode;
(c) forming a sold electrolyte between the cathode and anode wherein the solid electrolyte includes: a polymeric matrix; a plasticizer; a lithium salt; and LLZO, wherein the LLZO are nanoparticles with diameters that range from 20 nm to 2000 nm.

The solid-state electrolyte is a hybrid, ceramic-polymer nanocomposite material that exhibits high ionic conductivity and excellent chemical/electrochemical stability with respect to the electrodes. The electrolyte material is a polymer-plasticizer-lithium salt-inorganic filler mixture which preferably has an amorphous structure and large dielectric constant environment that is favorable for lithium ion dissociation and polymer chain assisted ion conduction. It can be used as an electrolyte layer or integrated or added into an electrode layer to form a composite electrode. The solid-state electrolyte is solid at room temperature (20° C.). No liquid organic solvent is required with the composite electrode.

The morphology of the processed electrolytes layer can be precisely controlled to achieve a desired composition gradient along the thickness direction. The microstructure of the solid electrolytes can be modified through processing optimization with gradient compositions at different electrolyte-electrode interfaces. For instance, the microstructure of the electrolyte can be controlled as ceramic nanoparticles are used as filler. The distribution of the ceramic nanoparticles can be manipulated during the processing by an internal local phase separation change. Ceramic nanoparticle dominated regions can be identified for improving electrolyte-electrode compatibility. Electrochemical cells and batteries based on this solid electrolyte with manipulated composition distribution can exhibit excellent performance.

The solid-electrolyte can be processed to create low interfacial resistances between the electrodes and the electrolyte. For instance, the solid electrolyte can be combined with the cathode material to form an interconnected network with an enlarged contact area between electrode and electrolyte for lithium ion transport. The solid electrolyte can establish intimate contact with cathode materials as they can be combined with cathode material to form a composite electrode and cathode layer that can be subject to co-sintering to promote contact between electrolyte and cathode layer. Lithium electrochemical cells and batteries employing the ceramic-polymer nanocomposite electrolyte will have reduced internal resistance and limited lithium dendrite growth as compared to cells and batteries based on polymer solid electrolytes. In addition, they will have enhanced cycling stability, and high specific capacitance at high charge-discharge rates (1C, 2C, 3C or 5C). Batteries with the novel ceramic-polymer nanocomposite electrolyte will meet severe specifications for wide temperature working range, quick charging requirement, and high energy density.

BRIEF DESCRIPTION OF THE DRAWINGS

FIGS. 3A, 3B and 3C are images of a free standing 10 wt % LLZO-polymer gel electrolyte thin film shown being subject to a fire-retardant test.

FIGS. 4A and 4B are charge-discharge curves that were measured at room temperature for coin cells containing different amounts of LLZO in the polymer gel electrolytes.

DETAILED DESCRIPTION OF PREFERRED EMBODIMENTS

The invention is directed to a highly ionic conductive solid electrolyte based on ceramic-polymer nanocomposite and the associated material processing methods. The high ion conductivity over a wide temperature window, optimized electrolyte-electrode interface, non-flammability of the novel class of electrolyte enables their use in any battery application from battery cells to integrated battery systems.

The solid electrolyte exhibits ionic conductivity of greater than $1 \times 10^{-3}$ S/cm (at room temperature) and has a large electrochemical window of up to 4.8V (at RT). In addition, it has a wide use temperature with a thermally stable temperature of up to 150° C. and a glass transition temperature of less than −60° C. Finally, the solid electrolyte shows low interfacial resistance, good compatibility with both lithium metal and cathode materials, and enhanced mechanical strength with a Young's modulus that exceeds 50 MPa.

Figure 1A:
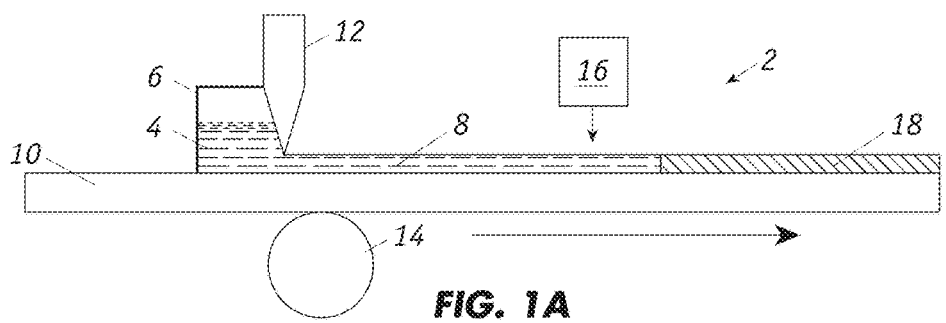
FIG. 1A is an apparatus for producing the high-ionic conductivity ceramic-polymer nanocomposite solid state electrolyte.

FIG. 1A shows a system 2 for preparing the solid electrolyte wherein a gel precursor 4 is formulated in tank 6. The gel precursor 4 comprises monomers, oligomers or partial polymers thereof (collectively referred to as polymer precursors), lithium salt, ceramic nanoparticles, and a plasticizer. The materials are preferably dried under vacuum before being mixed in tank 6 which is heated at a temperature sufficient to melt the plasticizer. When the plasticizer used is SCN, the tank heated to 60° C. An adjustable doctor blade 12 coats a wet film 8 of the gel precursor of the desired thickness onto a moving cathode substrate 10 which is supported by stationary roll 14. The cathode substrate 8 is also maintained at 60° C. For fabricating electrochemical cells, the wet film 8 is typically 100 to 900 µm thick. (Another technique of applying the wet film is by spraying the gel precursor.) UV radiation directed to wet film 8 from UV source 16 initiates in-situ radical polymerization to produce a layer of ceramic-polymer nanocomposite 18 which is an amorphous polymeric matrix in which the lithium salt and ceramic nanoparticles are distributed.

The ceramic nanoparticles within the wet film 8 of gel precursor that is disposed on the cathode substrate 10 have different surface energies than that of polymer precursor chain segments. Moreover, the top wet film-atmosphere interface and the lower wet film-substrate interface have different surface energies. To reduce the surface energy of the whole system, a phase separation within the ceramic-polymer nanocomposite 18 layer occurs after polymerization. It has been found that LLZO ceramic nanoparticles accumulate toward the top of the ceramic-polymer nanocomposite 18 layer, which has thickness (d), so that a ceramic nanoparticle gradient is established within the layer 18. A gradient is established along the thickness direction.

The cathode substrate 10 which is laminated with a layer of the ceramic-polymer nanocomposite 18 is further processed by laminating an anode material onto the exposed side of the nanocomposite layer. This tri-layer composite which includes an anode, solid state electrolyte (separator) and cathode can be cut into any desired configuration to form individual electrochemical cells.

Figure 1B:
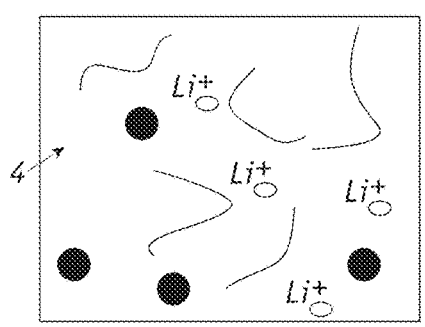
FIG. 1B depicts the composition of a gel precursor.

As depicted in FIG. 1B, the gel precursor 4 comprises polymer precursors, lithium salt, and ceramic nanoparticles that are mixed in a plasticizer. The polymer precursors are monomers or reactive oligomers that have average molecular weights of 200 to 1000 daltons and which can be polymerized to form polymers with average molecular weights of 10,000 to 100,000 daltons. Preferred polymer precursors include, for example, ethylene oxide, ethylene glycol diacrylate, ε-caprolactone, and acrylonitrile. These polymer precursors form poly(ethylene oxide) (PEO), poly (ethylene glycol diacrylate) (PEGDA), polycaprolactone (PCL), and poly(acrylonitrile) (PAN), respectively. The polymer precursors typically comprise 10 to 50 wt % and preferably 15 to 25 wt % of the gel precursor and the polymeric matrix that is derived from the polymer precursors typically comprise 10 to 50 wt % and preferably 15 to 25 wt % of the subsequent solid-state electrolyte.

The lithium salt is any lithium salt that is suitable for use in a non-aqueous electrolyte. Preferred lithium salts include, for example, $LiC_2F_6NO_4S_2$ (LiTFSI) and $LiClO_4$. The lithium salt typically comprises 20 to 60 wt % and preferably 30 to 40 wt % of the gel precursor and of the solid-state electrolyte.

The ceramic nanoparticles are $Al_xLi_{7-x}La_3Zr_{1.75}Ta_{0.25}O_{12}$ wherein x typically ranges from 0.01 to 1 and preferably ranges from 0.01 to 0.2 (LLZO). The ionic conductivity of a solid-state electrolyte can be influenced by the relative amounts of Al and Li that are in the LLZO ceramic nanoparticles. In particular, by varying x, the ionic conductivity can be optimized when the other components of the solid-state electrolyte are set. The LLZO comprise nanoparticles with diameters that range from 20 to 2000 nm. The LLZO typically comprises 5 to 60 wt % and preferably 15 to 25 wt % of the gel precursor and of the solid-state electrolyte.

The LLZO is synthesized by mixing stoichiometric amounts of starting powders including $LiOH \cdot H_2O$ (from Alfa Aesar, battery grade), $La_2O_3$, $ZrO_2$ (Sigma Aldrich, >99%), $Al_2O_3$ and $Ta_2O_5$ (Aldrich, >99%) and milling the mixture via high energy ball milling in ethanol media for 8-12 hrs. Zirconia balls (average diameter of 5 mm) balls at a ball-to-powder weight ratio of about 20:1 and about 360 rpm milling speed. After milling, the collected slurry is dried (80° C., 2-3 hrs.), crushed, and sieved (through a 200 mesh), and calcined at about 900° C. for 6 hours to fully decompose LiOH. The as-calcined powders are then ball-milled again in ethanol for 6-12 hrs. Planetary ball mill was used, followed by drying process. The dried powders were pressed into pellets with diameters of about 9.5 mm at about 300 MPa, and then sintered with a temperature range from 800° C. to 1150° C. for about 4 hrs. to obtain particles with size from 100 nm to 2000 nm. Both calcination and sintering processes are carried out with samples in alumina crucibles covered by alumina lids, and the pellets are embedded in corresponding mother powder in order to mitigate losses of volatile components and accidental contamination.

Incorporating LLZO into a polymer gel electrolyte produces a solid-state electrolyte with enhanced structural integrity and high ionic conductivity. Free standing solid-state electrolyte films can be fabricated when the amount of LLZO is at least about 10 wt % of the film.

The plasticizer is a compound that is preferably solid at room temperature (20° C.) and serves as a liquid medium in which the polymer precursors can be polymerized to form a polymer matrix. The plasticizer is an ionizer of the lithium salt in the solid-state electrolyte. A preferred plasticizer is succinonitrile (SCN) which has a melting point of 57° C. The plasticizer typically comprises 10 to 60 wt % and preferably 20 to 50 wt % of the gel precursor and of the solid-state electrolyte that is derived therefrom upon polymerization.

The ceramic-polymer nanocomposite electrolyte is particularly suited for use in electrochemical cells and batteries. An electrochemical cell refers to a composite containing an anode, a cathode and a solid-state electrolyte interposed therein. A battery refers to two or more electrochemical cells electrically interconnected to in an appropriate series/parallel arrangement to provide the required operating voltage and current levels. Electrochemical cells can be stacked into batteries of various configurations including pouch cells. Lithium ion electrochemical cells and batteries can exhibit 3.6V/2.5Ah energy and power performance typically in the range of 2.5 to 4.8 volts with an electric charge of 2.5 to 10-amp hour, preferred cells and batteries can operate at 3.6V with 2.5Ah.

The anode typically comprises a compatible anodic material which is any material which functions as an anode in an electrochemical cell. Preferred anodes comprise lithium and lithium alloys.

The cathode typically comprises a compatible cathodic material which is any material which functions as a positive pole in an electrochemical cell. Preferred cathodes comprise metal oxides and lithiated compounds thereof. A preferred cathode comprises $LiFePO_4$ (LFP).

Figure 2A:
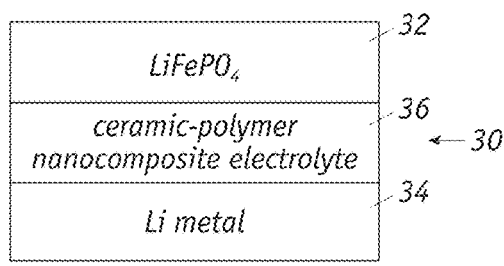
FIG. 2A is an electrochemical cell.
Figure 2B:
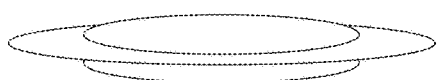
FIG. 2B is a coin cell.

FIG. 2A depicts an electrochemical cell 30 that comprises an LFP cathode 32 and lithium metal anode 34 with a ceramic-polymer nanocomposite solid-state electrolyte 36 interposed in between. The anode 34 and electrolyte 36 layers define a first interface where the lithium metal and electrolyte materials meet and form intimate contacts. Similarly, the cathode 32 and electrolyte 36 layers define a second interface where the LFP and electrolyte materials meet and form intimate contacts. The intimate contacts afford good ion transport and reduces interface resistance. In a preferred embodiment as further described herein, the ceramic nanoparticles are not homogenously distributed within the polymeric matrix, instead, there is a gradient within matrix whereby the concentration of ceramic nanoparticles is higher in the region adjacent the anode/electrolyte interface than at the region adjacent the cathode/electrolyte. That is, the region adjacent the first interface is ceramic nanoparticle rich composition and the region adjacent the second interface is polymer-gel rich composition. The electrochemical cell can be encapsulated to form a "coin cell" as shown in FIG. 2B. The coin cell has current collectors on the exterior surfaces of the cathode and anode. Electrochemical cells can be stacked into batteries.

Figure 2C:
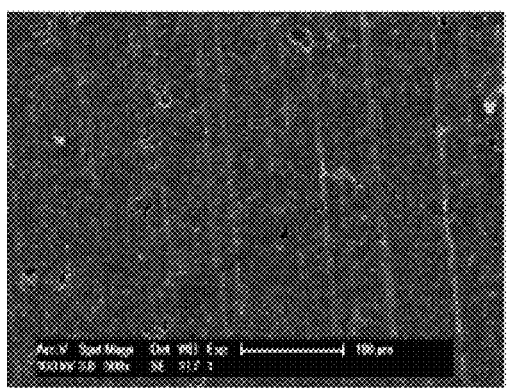
FIGS. 2E and 2D are cross sectional scanning electron microscopy images of a coin cell containing a LLZO-polymer gel electrolyte composite.
Figure 2D:
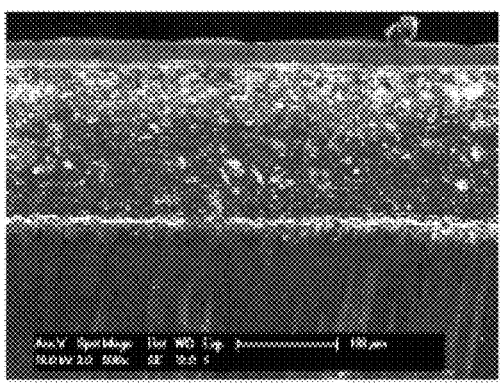

FIGS. 2C and 2D are cross sectional SEM images of a coin cell containing a LLZO-polymer gel electrolyte composite. The images show good intimate contacts between the lithium anode and the electrolyte layer and between the cathode and the electrolyte layer.

A free-standing solid-state electrolyte comprising 27 wt % PEO polymer matrix, 36 wt % LiTFSI, 27 wt % SCN, and 10 wt % LLZO was fabricated and is shown in FIG. 3A. The electrolyte was exposed to a flame as shown in FIGS. 3B and 3C for 10 seconds and the electrolyte was non-flammable and exhibited good fire resistance.

Coin cells comprising a lithium metal anode, an LFP cathode and solid-state electrolytes which included the same proportions of (1) PEO polymer matrix, (2) LiTFSI, and (3) SCN, but different fractions of LLZO were fabricated and tested. That is, the relative weight proportions of the polymer matrix, lithium salt and plasticizer in the solid-state electrolyte were the same at a 30/40/30 weight ratio but the amounts of LLZO varied. The LLZO comprised $Al_{1.5}Li_{6.85}La_3Zr_{1.75}Ta_{0.25}O_{12}$.

FIG. 4A are the voltage vs. specific capacitance curves for coin cells tested at room temperature at a charging-discharging rate of 0.05 C. The amount of LLZO present is the wt % relatively to the other components. The addition of LLZO does not affect the specific capacitance at this relatively low charging-discharging rate. The CV curves suggest that the coin cells have a discharge capacitance of about 120 mAh/g.

Figure 4B:
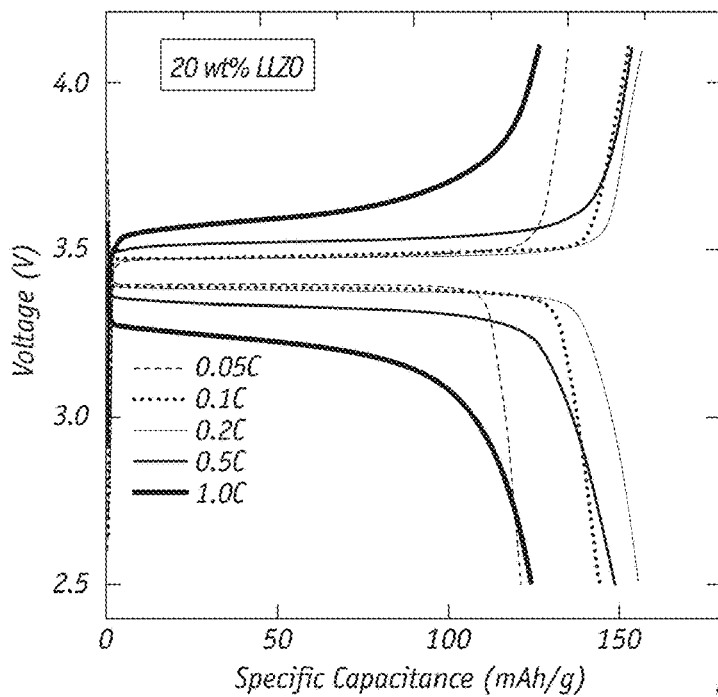

Coin cells with 20 wt % LLZO in the composite electrolyte were tested at different charging-discharging rates from 0.05C to 1.0C. As shown in FIG. 4B, the specific capacitance increased to about 140 mAh/g when the test current was at 0.1C and the highest specific capacitance, which is close to the theoretical capacitance of LFP (about 160 mAh/g), was achieved at 0.2C. The coin cell still had a high specific capacitance (over 150 mAh/g) when tested at 0.5C. The data suggests that coin cells with 20 wt % LLZO relative to the other components are less affected by the test rate.

Figure 5A:
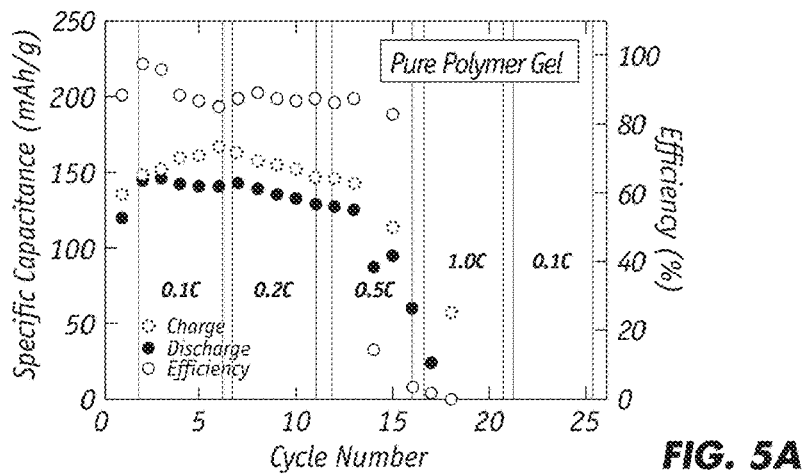
FIGS. 5A, 5B and 5C are cycling performances for coin cells containing polymer gel and LLZO-polymer gel electrolytes.
Figure 5B:
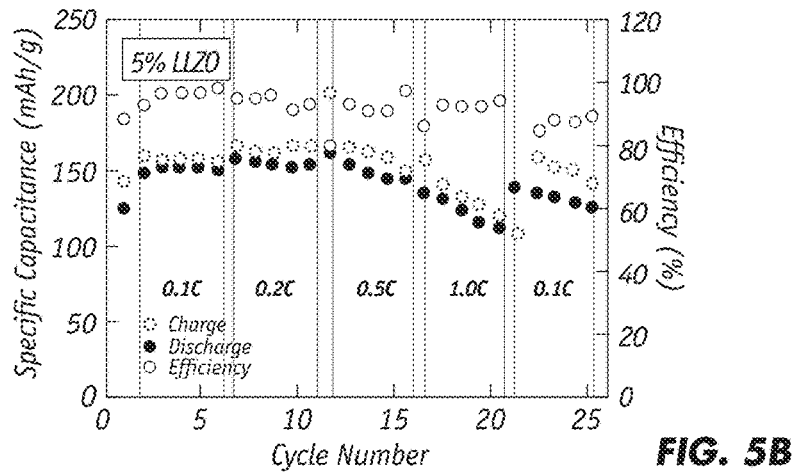
Figure 5C:
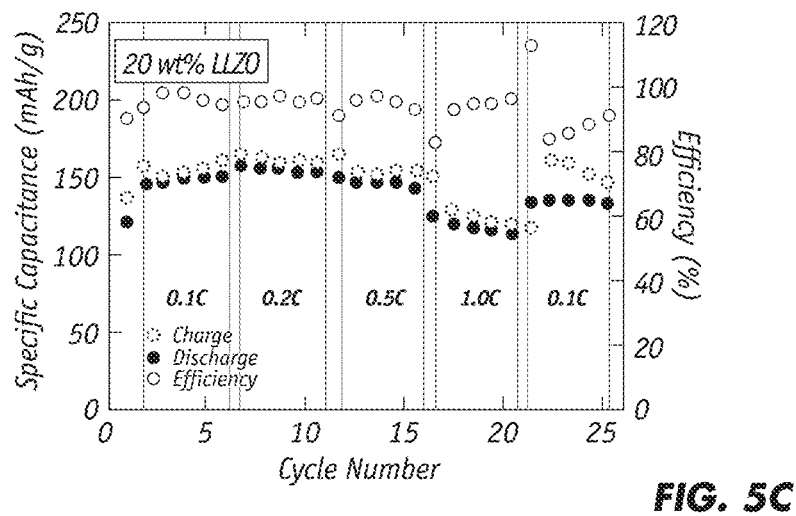

The amount of LLZO in the composite electrolytes affects the cycling stability of the coin cells. FIGS. 5A, 5B, and 5C show the cycling performance of coin cells with pure polymer gel electrolyte, 5 wt % LLZO and 20 wt % LLZO relative to the other components as tested at 24.85° C. As shown in FIG. 5A, coin cells based on pure polymer gel electrolyte with no LLZO has decreased specific capacitance when cycling at 0.2C, furthermore, the cell has very poor stability and significantly degraded performance when cycling at a rate larger than 0.2C. With the addition of 5 wt % LLZO into the electrolyte, as shown in FIG. 5B, the coin cell has good cycling stability at 0.2C, but it exhibits decreasing specific capacitance when scanning at a rate of 0.5C and 1.0C. For this coin cell, when the scan rate is reduced back to 0.1C, the coin cell still shows poor cycling stability. As shown in FIG. 5C, when the LLZO weight fraction is increased to 20 wt %, the coin cell exhibits excellent cycling stability at 0.1C, 0.2C, 0.5C, and even at 1C. As is apparent, only a slight reduction in specific capacitance is obtained when cycling at 1C. When the scan rate is set back to 0.1C, the specific capacitance can be fully recovered up to its original value. Meanwhile, the coin cell still has good cycling stability with negligible changes in specific capacitance. Proper selection of the LLZO weight ratio can improve the cycling stability of coin cells at large scan rates and coin cell based on 20 wt % LLZO-polymer gel electrolyte exhibits good specific capacitance and cycling stability at large scan rate (0.5C and 1C).

Figure 1C:
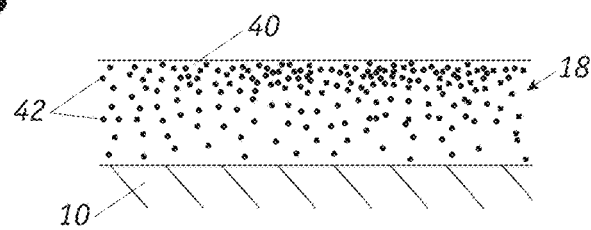
FIG. 1C depicts a gradient of LLZO nanoparticles within the ceramic-polymer nanocomposite solid-state electrolyte.

One feature of the invention is that the differences in surface energies between the polymer and ceramic filler in the solid-state electrolyte can be used to manipulate distribution of the ceramic filler in the solid-state electrolyte. As shown in FIG. 1B, the gel precursor 4 includes LLZO ceramic nanoparticles and monomers (and oligomers) that form the ceramic-polymer gel electrolyte, wherein LLZO nanoparticles are blended with 'plasticizer-softened' polymers. It has been observed that as the monomers and oligomers undergo polymerization to form the gel electrolyte, the LLZO nanoparticles accumulate at the atmosphere/gel electrolyte interface (namely the top of the solid electrolyte layer) to establish a gradient where the levels of LLZO at the gel electrolyte is towards one side of the gel electrolyte. FIG. 1C illustrates the cathode substrate 10 which is laminated with a layer of the ceramic-polymer nanocomposite 18 in the system 2 shown in FIG. 1A. The polymeric matrix 40 is formed on substrate 110 and the ceramic nanoparticles 42 are not homogeneously distributed. The particles form a gradient in the direction of the surface so that the proportion of ceramic nanoparticles increases in the direction of the surface. This upper side of the gel electrolyte, on which the anode is disposed, has enhanced mechanical strength and the higher concentration of LLZO acts as a barrier to lithium dendrite growth. The a LLZO rich and polymer-gel rich composition Solid-state electrolytes containing 20 wt % LLZO relative to the other components in polymer gel electrolyte were prepared on a substrate so that the top surface of the polymer gel electrolyte had a higher concentration of LLZO that the lower surface which was in contact with the substrate. A first set of coin cells (designated sample 1) were prepared wherein a lithium anode was disposed on the top side and an LFP cathode disposed on bottom side. A first set of coin cells (designated sample no. 1) were prepared wherein a lithium anode was disposed on the top side and an LFP cathode disposed on the bottom side. A second set of coin cells (designated sample no. 2) were prepared wherein a lithium anode was disposed on the bottom side and an LFP cathode disposed on the top side. Both sets of coin cells were tested at different charge-discharge rates.

Figure 6A:
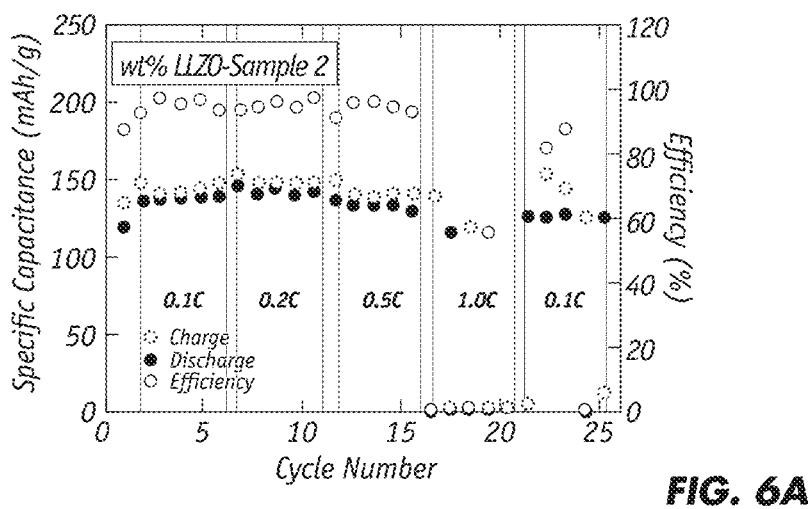
FIGS. 6A and 6B are cycling performances for coin cells containing LLZO-polymer gel electrolyte with different compositional gradients along the thickness direction of the electrolyte film.

As shown in FIG. 6A, the sample no. 2 coin cells have almost the same specific capacitance when tested at 0.1C, 0.2C, and 0.5C. These coin cell which have solid electrolytes with the top side of the thin solid-state electrolyte contacting the LFP cathode, showed an almost zero specific capacitance and almost zero columbic efficiency. When the scan rate is set back to 0.1C, the specific capacitance of the coin cells recovered to almost their original value. The data suggests that the large decease in the cycling performance of the coin cells at 1C is due to the large resistance at cathode/top side electrolyte interface.

Figure 6B:
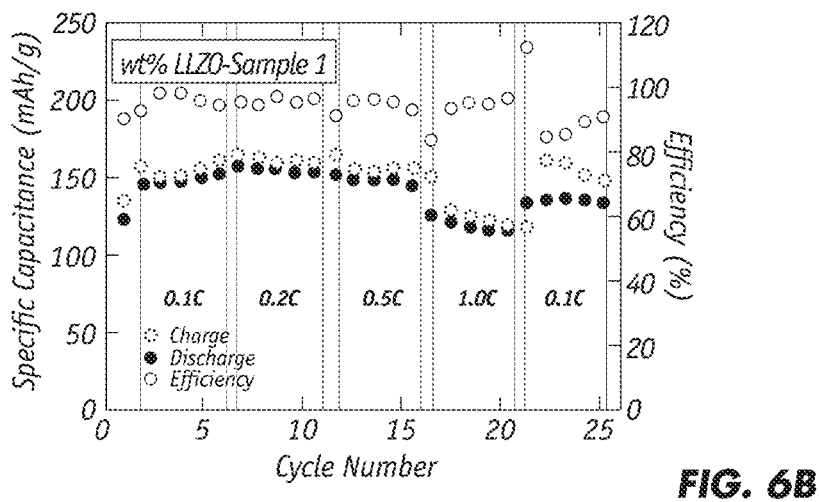

As shown in FIG. 6B, the cycling performance of the sample no. 1 coin cells exhibited good specific capacitance (over 120 mAh/g) at a scan rate of 1C, in addition, they also showed good cycling stability, where the specific capacitance of the coin cells did not drop within 5 cycle testing at 1C. When the scan rate is reduced back to 0.1C, the same phenomenon occurred whereby the specific capacitance of the coin cells almost recovered to their original values.

Figure 7:
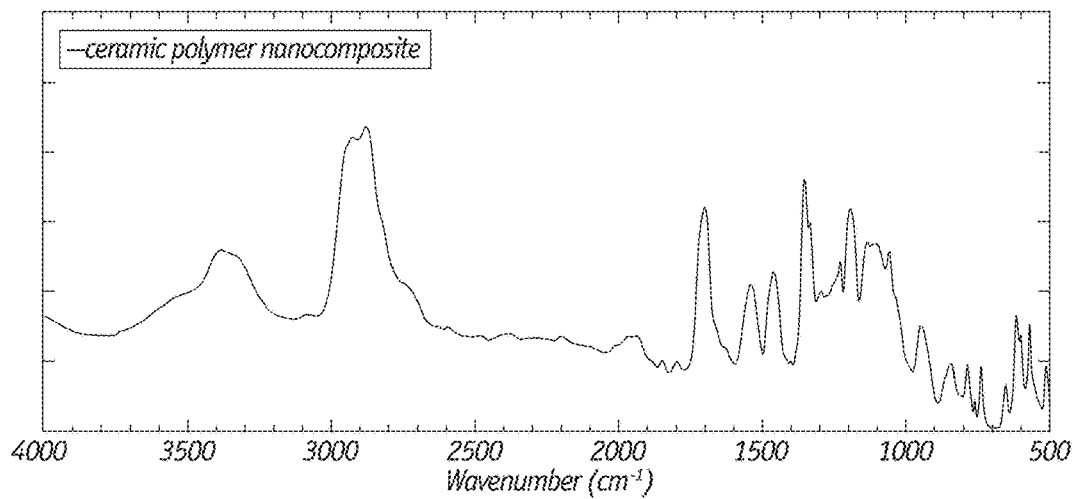
FIG. 7 is a Fourier Transform Infrared spectrum of a LLZO-polymer gel electrolyte composite.
Figure 8:
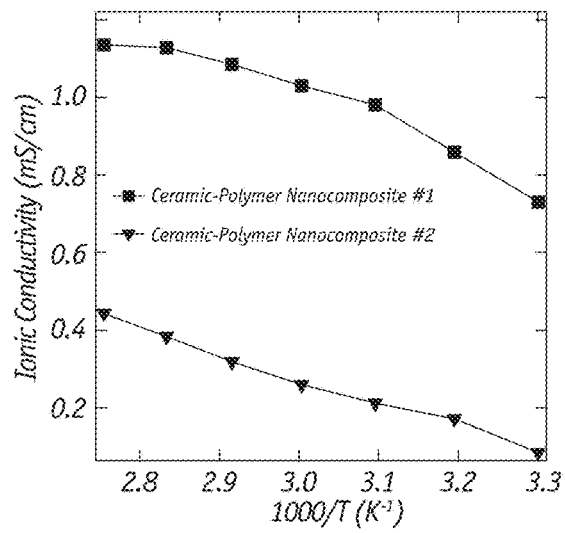
FIG. 8 is a graph of ionic conductivity vs. temperature of a LLZO-polymer gel electrolyte composite.

In the present invention, the coordination between 'plasticizer-softened' polymer chain and the lithium source was controlled through the composition ratio of each component and the resultant micro-morphology. The FT-IR peaks in the finger print region of lithium salt and polymer chain from a ceramic-polymer nanocomposite electrolyte, as shown in FIG. 7, suggests a strong coordination between the polymer chain and dissociated lithium ions, which enables chain-assisted lithium ion motion. Increasing the strength of the coordination improves the lithium ion transport through the ceramic-polymer domains. Consequently, the ceramic-polymer nanocomposite with LLZO exhibits superior ionic conductivity over a wide temperature window, which is shown in FIG. 8. The ionic conductivity is higher than $1\times10^{-3}$ S/cm. This high ionic conductivity eventually leads to low internal resistance. Thus, the loss during charge and/or discharge process due to the resistance is minimized. Owing to the low internal resistance, the coin cells based on ceramic-polymer nanocomposite electrolytes are able to operate under a large current (e.g. 0.5C, 1C etc.). Meanwhile, stable cycling performances are obtained from these coin cells.

Figure 9:
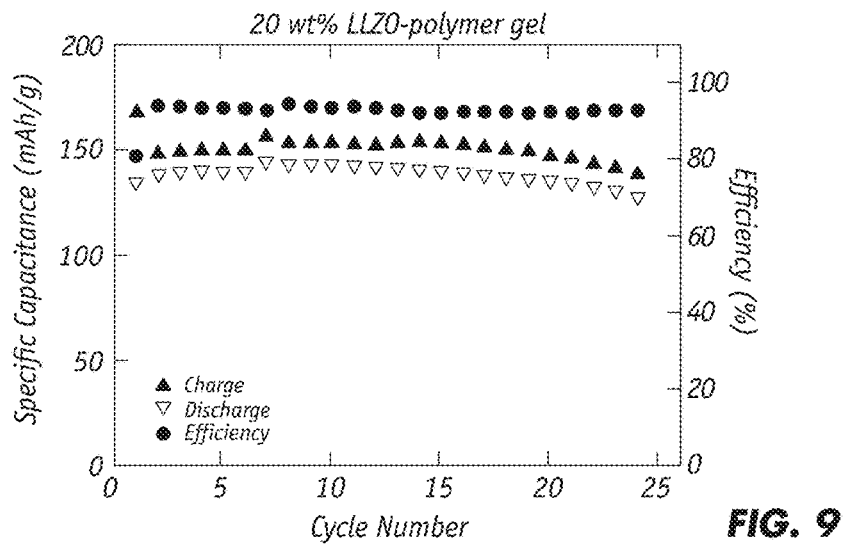
FIG. 9 is the cycling performance for a coin cell with a LLZO-polymer gel electrolyte composite.

FIG. 9 shows the cycling stability of a coin cell with 20 wt % LLZO-polymer gel that is scanned at 1C.

The foregoing has described the principles, preferred embodiment and modes of operation of the present invention. However, the invention should not be construed as limited to the particular embodiments discussed. Instead, the above-described embodiments should be regarded as illustrative rather than restrictive, and it should be appreciated that variations may be made in those embodiments by workers skilled in the art without departing from the scope of present invention as defined by the following claims.

What is claimed is:

1. A fire-resistant, non-flammable ceramic-polymer film that comprises: a polymer matrix; a plasticizer; a lithium salt; and $Al_xLi_{7-x}La_3Zr_{1.75}Ta_{0.25}O_{12}$ where x ranges from 0.01 to 0.2 (LLZO), wherein the LLZO are nanoparticles with diameters that range from 20 to 2000 nm and wherein the film has an ionic conductivity of greater than $1\times10^{-3}$ S/cm at room temperature wherein the polymer matrix comprises PEGDA which comprises 15 to 25 wt % of the film, the plasticizer comprises succinonitrile (SCN) which comprises 20 to 50 wt % of the film, the lithium salt comprises LiTFSI which comprises 30 to 40 wt % of the film, and the LLZO comprises 15 to 25 wt % of the film and wherein the film is free standing and has a thickness that ranges from 100 to 900 μm and the film is thermally stable up to 150° C.

2. The film of claim 1 which has a Young's modulus that exceeds 50 MPa.

3. An electrochemical cell which comprises: an anode; a cathode; and interposed therebetween is a solid-electrolyte which is a fire-resistant, non-flammable film which comprises:
- a polymeric matrix;
- a plasticizer;
- a lithium salt; and
- $Al_xLi_{7-x}La_3Zr_{1.75}Ta_{0.25}O_{12}$ where x ranges from 0.01 to 0.2 (LLZO), wherein the LLZO are nanoparticles with diameters that range from 20 to 2000 nm wherein the polymer matrix comprises PEGDA which comprises 15 to 25 wt % of the film, the plasticizer comprises succinonitrile (SCN) which comprises 20 to 50 wt % of the film, the lithium salt comprises LiTFSI which comprises 30 to 40 wt % of the film, and the LLZO comprises 15 to 25 wt % of the film and wherein the film is free standing and has a thickness that ranges from 100 to 900 μm and the film is thermally stable up to 150° C.

4. The electrochemical cell of claim 3 wherein the anode comprises lithium.

5. The electrochemical cell of claim 3 wherein the cathode comprises lithium iron phosphate.

6. The electrochemical cell of claim 3 wherein the film has a Young's modulus that exceeds 50 MPa.

7. A fire-resistant, non-flammable ceramic-polymer film that comprises: a polymer matrix; a plasticizer; a lithium salt; and $Al_xLi_{7-x}La_3Zr_{1.75}Ta_{0.25}O_{12}$ where x ranges from 0.01 to 1 (LLZO), wherein the LLZO are nanoparticles with diameters that range from 20 to 2000 nm, wherein the film has an ionic conductivity of greater than $1\times10^{-3}$ S/cm at room temperature, wherein the polymer matrix is PEO and comprises 27 wt % of the film, the lithium salt is LiTFSI and comprises 36 wt % of the film, the plasticizer is SCN and comprises 27 wt % of the film, the LLZO comprises 10 wt % of the film, wherein the film is free standing and has a thickness that ranges from 100 to 900 μm, and the film is thermally stable up to 150° C.

8. An electrochemical cell which comprises: an anode; a cathode; and interposed therebetween a solid-electrolyte is a fire-resistant, non-flammable, and stable film which comprises:
- a polymeric matrix;
- a plasticizer;
- a lithium salt; and
- $Al_xLi_{7-x}La_3Zr_{1.75}Ta_{0.25}O_{12}$ where x ranges from 0.01 to 1 (LLZO), wherein the LLZO are nanoparticles with diameters that range from 20 to 2000 nm, wherein the polymer matrix is PEO and comprises 27 wt % of the film, the lithium salt is LiTFSI and comprises 36 wt % of the film, the plasticizer is SCN and comprises 27 wt % of the film, the LLZO comprises 10 wt % of the film, wherein the film is free standing and has a thickness that ranges from 100 to 900 μm, and the film is thermally stable up to 150° C.

9. A process for preparing an electrochemical cell which comprises:
(a) providing a cathode;
(b) providing an anode;
(c) forming a sold-electrolyte between the cathode and anode wherein the solid electrolyte is a film that comprises:
- a polymeric matrix;
- a plasticizer;
- a lithium salt; and
- $Al_xLi_{7-x}La_3Zr_{1.75}Ta_{0.25}O_{12}$ where x ranges from 0.01 to 0.2 (LLZO), wherein the LLZO are nanoparticles with diameters that range from 20 to 2000 nm wherein the polymer matrix comprises PEGDA which comprises 15 to 25 wt % of the film, the plasticizer comprises succinonitrile (SCN) which comprises 20 to 50 wt % of the film, the lithium salt comprises LiTFSI which comprises 30 to 40 wt % of the film, and the LLZO comprises 15 to 25 wt % of the film and wherein the film is free standing and has a thickness that ranges from 100 to 900 μm and the film is thermally stable up to 150° C.

10. The process of claim 9 wherein the film has a Young's modulus that exceeds 50 MPa.

11. A process for preparing an electrochemical cell which comprises:
(a) providing a cathode;
(b) providing an anode;
(c) forming a sold-electrolyte between the cathode and anode wherein the solid electrolyte is a film that comprises:
- a polymeric matrix;
- a plasticizer;
- a lithium salt; and
- $Al_xLi_{7-x}La_3Zr_{1.75}Ta_{0.25}O_{12}$ where x ranges from 0.01 to 1 (LLZO), wherein the LLZO are nanoparticles with diameters that range from 20 to 2000 nm, wherein the polymer matrix is PEO and comprises 27 wt % of the film, the lithium salt is LiTFSI and comprises 36 wt % of the film, the plasticizer is SCN and comprises 27 wt % of the film, the LLZO comprises 10 wt % of the film, and wherein the film is free standing and has a thickness that ranges from 100 to 900 μm and the film is thermally stable up to 150° C.

* * * * *